Patented Feb. 15, 1938

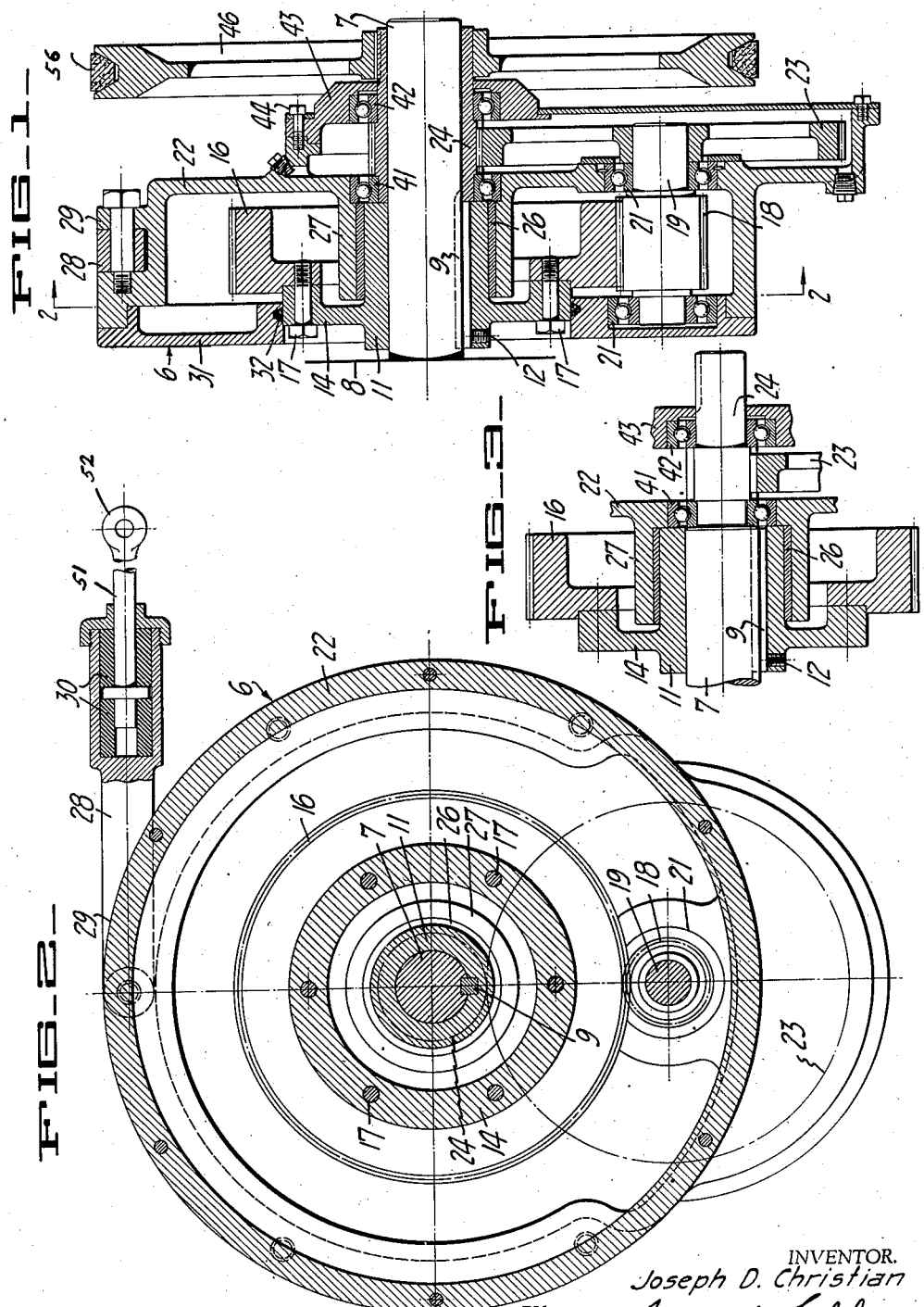

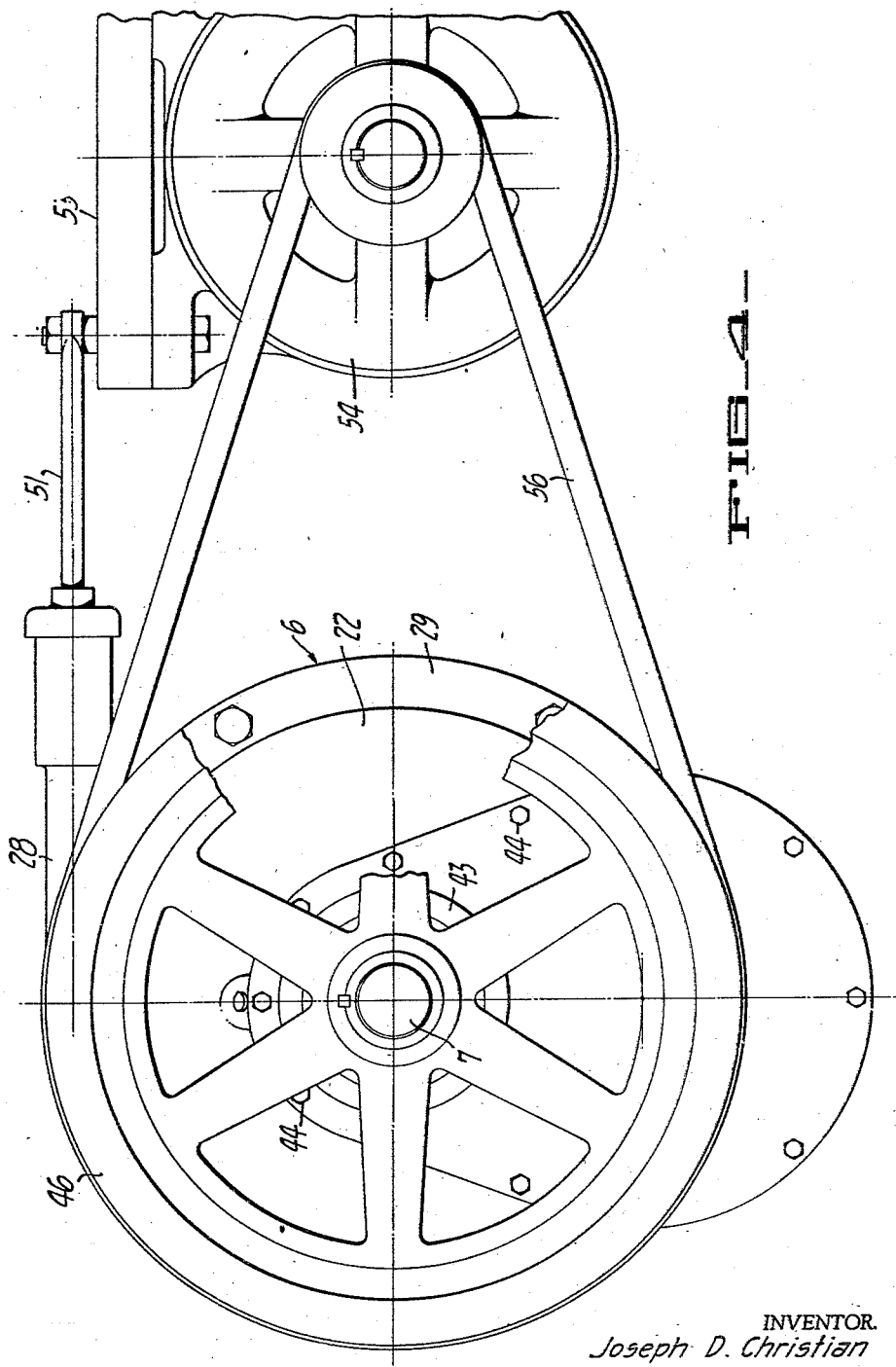

2,108,367

UNITED STATES PATENT OFFICE 2,108,367

SPEED CHANGE DEVICE

Joseph D. Christian, San Francisco, Calif.

Application November 28, 1936, Serial No. 113,246

3 Claims. (Cl. 74—421)

This invention relates to a speed change device.

In my prior Patent No. 1,860,703, issued May 31, 1932, I have disclosed a construction of an electric power unit in which an electric motor is mounted upon and supported by a speed change unit, the motor and the speed change unit being mounted together upon a base provided only beneath the speed change unit. The device of this patent met with a recognized commercial success, and resulted in the advent of what is now known in the commercial art as "motorized speed reducers".

Because of the nature of the structure utilized, the cost of the unit of my aforesaid patent has been relatively high. This is necessarily so because, for example, to provide such a unit an electric motor is first purchased and reconstructed for reception in the speed change unit, the motor shaft being bored or splined to receive a direct connection to a shaft in the speed reduction unit. This of course involves charges in procuring the customer's motor, in taking down the motor, in either remachining its standard shaft, or else making a new shaft, and in assembling the motor on the reduction unit.

A further objection to units of this type has been encountered in the lack of flexibility in effecting any speed change in a simple and inexpensive manner. With the motor directly coupled to a shaft in the speed reducing unit, a change in speed between the motor and the speed reduction unit was not possible. The only change that could be effected, so far as the unit itself was concerned, was to take the unit apart and change the gears therein.

Since this required removal of the unit from the base upon which it was supported, and taking down of the entire unit, the cost was too high and this was rarely done. If it was attempted to secure a change of speed between the driven shaft and the speed reducing unit, as by providing a gear or sprocket and chain drive, it was necessary to provide elements of comparatively heavy construction and comparatively high cost, because of the low speed of operation.

The device of the present invention obviates all of the previously discussed difficulties. It enables a standard motor to be used without changing anything on the motor, without requiring any special machining or other fitting on the motor. It also enables a speed change to be secured between the motor and the speed reducing unit, a simple and inexpensive chain, a flat belt, or V belt being utilized for this. To effect a change in speed, it is only necessary to change the sprockets or pulleys, a matter of a few moments' work, since nothing need be removed from a base or taken out of alignment. If a V belt or flat belt drive is employed, shock absorbing means are provided which will absorb much of the shock of the suddenly applied load. This feature is one of considerable value, inasmuch as some difficulty was encountered in the previous units of my patent, it being necessary to provide a relatively rugged base and casing structure for the speed change unit, as well as gearing and other internal construction of high service factors, to take the abuse.

It is an object of the present invention to provide an improved and simplified speed change unit construction.

Another object of the present invention is to provide a device in which the speed change unit is carried directly by the device to be driven. Thus, in accordance with this invention, if a pump, mill, or other unit is to be driven, the speed change unit is mounted directly upon the power input shaft of the pump, mill or other unit.

Another object of the present invention is to provide a novel speed change unit, particularly as to the support therefor.

Another object of the present invention is to provide a novel pinion gear and sprocket or pulley mounting and a bearing support therefor.

Another object of the present invention is to provide a novel shock absorbing means in a speed change unit.

The invention includes other features and objects of advantage, some of which, together with the foregoing, will appear hereinafter, wherein present preferred structures embodying the present invention are disclosed.

In the drawing accompanying and forming a part hereof:

Figure 1 is a vertical section through a device embodying my invention.

Figure 2 is a section on line 2—2 of Figure 1.

Figure 3 is a fragmentary view of a modification.

Figure 4 is a side elevation showing the unit of this invention in combination with a prime mover.

In accordance with this invention, I provide a speed change unit which is carried entirely by the structure to which the power is to be imparted. Thus, as appears in the drawing, I mount the speed reducer unit indicated generally by numeral 6 upon an element 7 to be rotated.

In this instance, I have shown element 7 as a shaft which extends from the unit to be driven, in this case indicated by numeral 8. Mounted upon the shaft 7 and secured thereto by a key 9 is a hub 11. A set screw 12 is employed to retain the hub in place upon the key.

In accordance with this invention, the speed change unit is mounted upon and supported by the hub, which, as will be noted, is carried entirely by the shaft 7. In the unit disclosed, this construction is provided by a flange 14 extending from the hub upon which is mounted a spur gear 16 by means of cap screws 17. This spur gear is driven by a gear 18 carried upon a shaft 19. Shaft 19 is supported in ball bearings 21 mounted in a frame structure generally indicated at 22. Mounted upon one end of the shaft 19 is another gear 23, which is meshed with a pinion gear 24.

In accordance with this invention, the housing structure 22 is supported upon the driven shaft 7. This is effected by providing a bushing 26 upon the hub and providing an inwardly extending flange 27 on the housing structure 22, so that the housing is rotatably mounted upon the bearing structure provided by the bushing 26 upon the hub. Upon rotation of the pinion gear 24, gear 23 is driven. This in turn rotates the shaft 19 and gear 18, thus effecting a driving of the ring gear 16.

Rotation of the housing is resisted, preferably resiliently, so that torque is absorbed from the driving unit. This is effected by securing an extension indicated by numeral 28 upon end 29 of the housing. Movement of the extension 28 is resisted, preferably resiliently as by positioning rod 51 with a flange 52 thereon between oppositely supported rubber blocks 30, as appears in Figure 2 of the drawing. The rod 51 is secured as to a support 53 for motor 54.

The housing structure 22 includes a portion 31 which extends about and fits against the flange 14 provided upon the hub. Packing means, such as that indicated at 32, are preferably provided to maintain a tight oil seal, although other oil seal means can be provided between the flange 14 and the portion 31 of the housing.

In accordance with this invention, a novel support means is provided for the pinions 24. This support means is provided by ball bearings 41 and 42. Ball bearings 41 are mounted in the housing structure 22, while ball bearings 42 are mounted in a cover structure indicated generally by numeral 43, which is attached and fitted to the outside of the housing, being retained in place by screws 44.

The pinion gear is provided upon the central portion of the member 24, extending between the ball bearings. Member 24 can either be solid, as appears in Figure 3, or in sleeve form, as in Figure 1. When member 24 is solid, it can be reduced in diameter irrespective of the size of shaft 7, so that a further reduction can be effected by it and gear 23. Member 24 is extended beyond cap structure 43 to receive and support thereon a suitable power input means as any one of the standard pulleys or gear sprockets, such as that indicated at 46. The power input means 46 is driven by a suitable prime mover as motor 54 through suitable power transmitting means, as V belt 56.

In Figure 1 I have shown member 24 as being hollow, and with shaft 7 extending therethrough. This construction is useful when it is desired to mount the unit upon a line shaft or upon some other piece of equipment when the shaft must extend therethrough. In such a case, having member 24 hollow materially assists in reducing the diameter thereof, since only a few thousandths of an inch clearance need be provided between it and the shaft 7.

In the foregoing disclosure I have dealt only with gearing. It is of course obvious that, instead of gearing, sprockets and chain drives can be substituted, or even pulleys and V belts, if desired, to effect the reduction in speed. However, these are only mechanical equivalents for the gearing, and accordingly the present claims should be accorded a range of equivalents in this respect, the terms "gear" and "gearing" being employed herein and in the claims as including these other obvious mechanical equivalents.

I claim:

1. In combination, a prime mover, a shaft to be driven, a casing structure having three parallel wall members therein, a gear having a hub, at least one of said wall members being flanged inwardly within the casing toward another of said wall members, and supported for rotation on said gear hub, means for securing said hub to said shaft to position and support said casing structure on said shaft, another gear, a shaft extending into said casing and carrying said another gear, and bearing means in two of the parallel wall members on each side of said another gear, gearing connecting said gear and said another gear, and means connecting said extending shaft and said prime mover.

2. In combination, a prime mover, a shaft to be driven, a casing structure having three parallel wall members therein, a gear having a hub, at least one of said wall members being flanged inwardly within the casing toward another of said wall members, and supported for rotation on said gear hub, means for securing said hub to said shaft to position and support said casing structure on said shaft, another gear, a shaft extending into said casing and carrying said another gear, said extending shaft being hollow and freely passing said driven shaft, bearing means in two of the parallel wall members on each side of said another gear, gearing connecting said gear and said another gear, and means connecting said extending shaft and said prime mover.

3. In combination, a prime mover, a shaft to be driven, a casing structure having three parallel wall members therein, a gear having a flanged hub extending along said shaft and a gear face over-hanging at least a portion of said flanged hub, at least one of said wall members being flanged inwardly within the casing toward another of said wall members, and supported for rotation on said gear hub beneath said overhanging gear face, means for securing said hub to said shaft to position and support said casing structure on said shaft, another gear, a shaft extending into said casing and carrying said another gear, and bearing means in two of the parallel wall members on each side of said another gear, gearing connecting said gear and said another gear, and means connecting said extending shaft and said prime mover.

JOSEPH D. CHRISTIAN.